Jan. 9, 1968   M. ORAIN   3,362,192
UNIVERSAL JOINT
Filed May 25, 1966   4 Sheets-Sheet 2

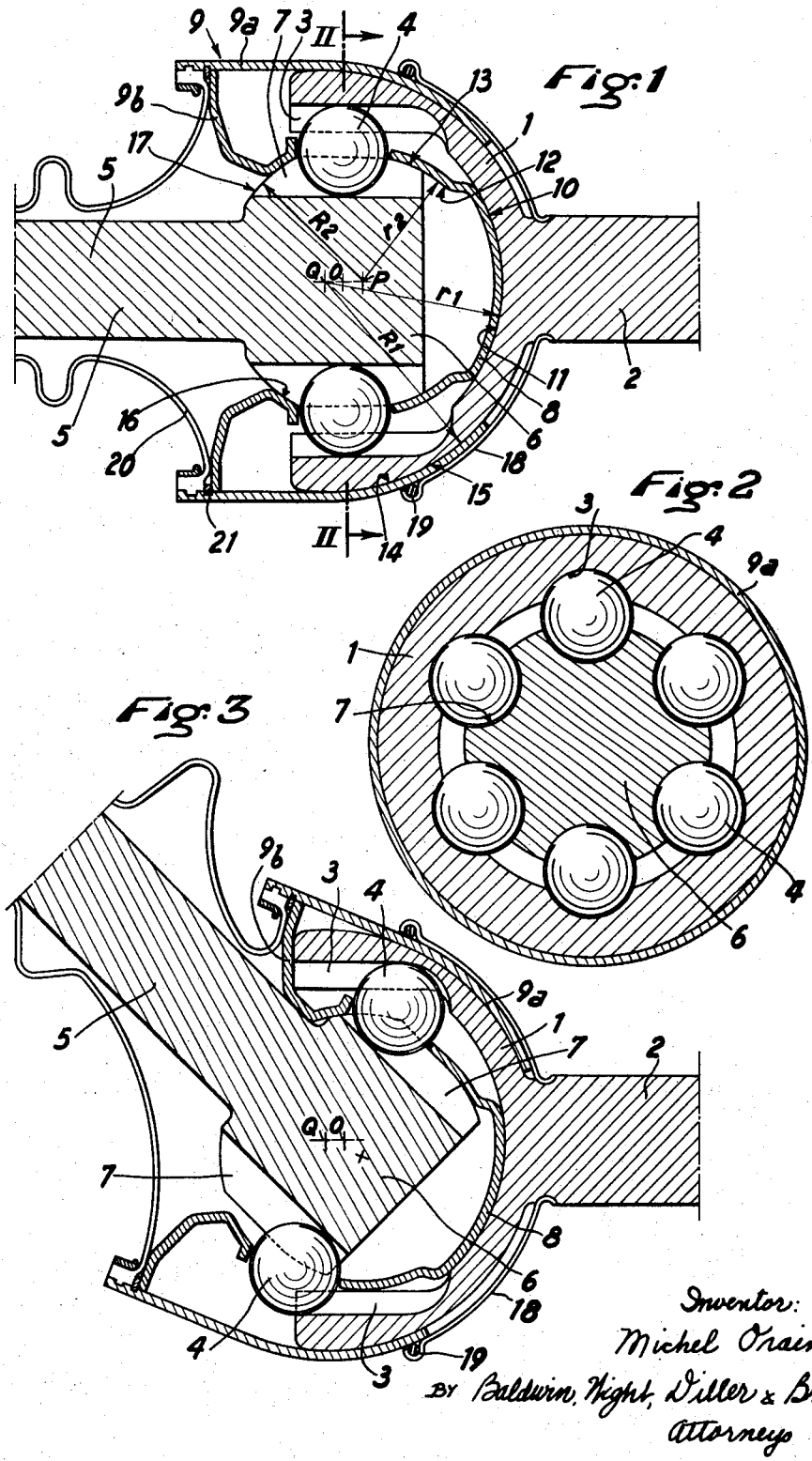

Inventor
Michel Orain
BY Baldwin, Wight, Diller & Brown
Attorneys

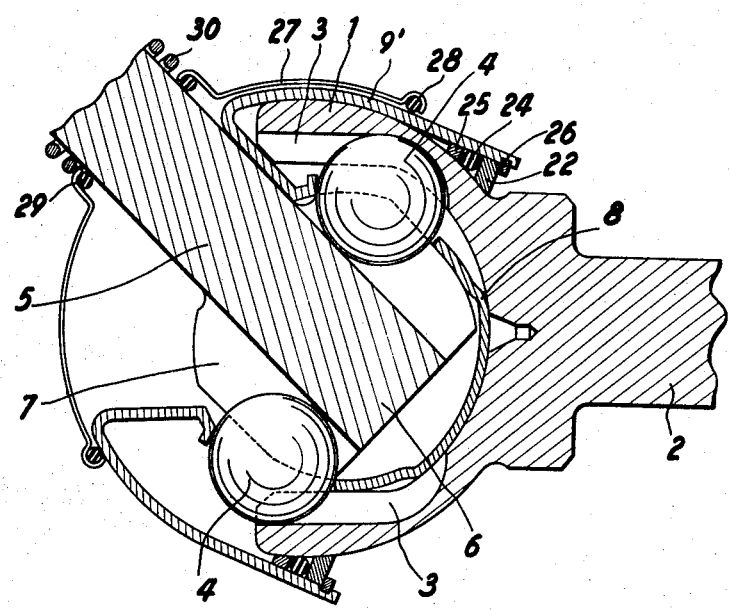
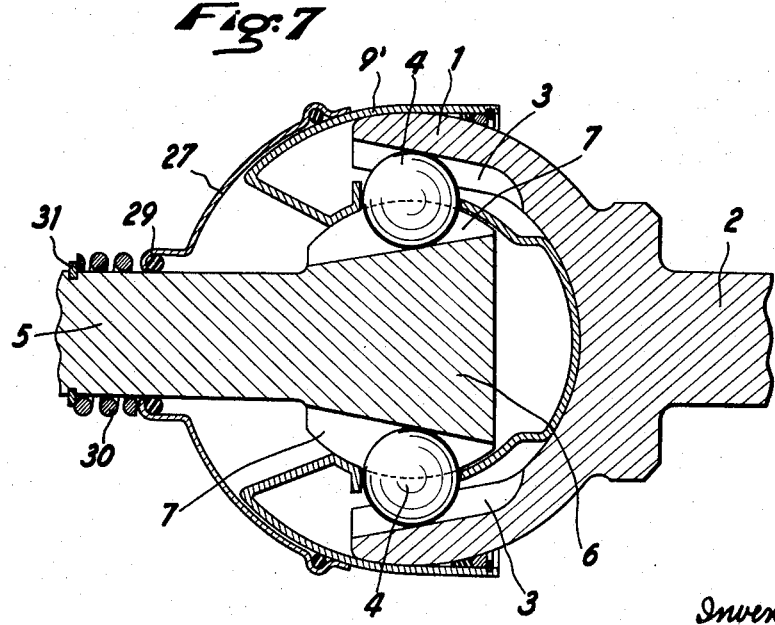

Jan. 9, 1968   M. ORAIN   3,362,192
UNIVERSAL JOINT
Filed May 25, 1966   4 Sheets-Sheet 4 ial View of a first em-
United States Patent Office 3,362,192
Patented Jan. 9, 1968

3,362,192
UNIVERSAL JOINT
Michel Orain, Poissy, France, assignor to Societe
Anonyme: Glaenzer Spicer, Poissy, France, a corporation of France
Filed May 25, 1966, Ser. No. 552,769
Claims priority, application France, May 26, 1965,
18,550
6 Claims. (Cl. 64—21)

The present invention relates to a homokinetic universal joint for mechanical transmission of movement between two rotating shafts more particularly of the type in which the connection between the two shafts is obtained by means of a ring of balls maintained in the plane bisecting the angle formed by the said two shafts, said balls each rolling in two opposed substantially hemicylindrical ball races formed, one in the outer surface of a shaft head solid with, or rigidly secured to one of the shafts, and the other in the inner surface of a bell member or socket solid with, or secured to the second shaft, each of said paths being substantially parallel, or slightly oblique with the axis of the corresponding shaft.

In known joints of the above mentioned type, the ring of balls is maintained in the plane bisecting the two shafts by means of a cage including inner and outer spherical surfaces, and openings accurately machined to receive the balls. This entailed complicated machining and adjustment operations, as well as a high cost of manufacture. Furthermore, the maximum angle of one shaft with the other during operation of the joint is limited.

One object of the invention is to provide a universal joint of the above mentioned "ball ring" type which may be quickly and economically manufactured.

Another object of the invention is to provide a joint of said type in which most of the parts may be directly obtained by extrusion, cold stamping and forging, and like operations without further machining.

A universal joint according to the invention for transmission of power between two angularly displaceable shafts comprises a head member rigidly secured to one of said two shafts and a spherical bell member rigidly secured to the other shaft and engaging over said head member, said head member and said bell member each being provided with a plurality of circumferentially spaced, rectilinear ball races each of which is contained in a plane substantially parallel, or slightly oblique with respect to the corresponding shaft, said ball races in said head member and in said socket member facing each other by pairs and each pair of races containing one ball, said balls forming a ring of connecting balls, and a cage-like structure for maintaining said balls, said cage-like structure comprising an outer flange and an inner flange, said flanges arranged on either side of said ring of balls, respectively said inner flange having two active spherical surfaces, one adapted to slide on an inner spherical surface of said bell member and the other on a first external spherical surface of said head member, and said outer flange also having two active spherical surfaces, one adapted in slide on an outer, spherical surface of the bell member and the other on a second outer spherical surface of the shaft head, said inner and outer flanges being adapted to maintain the ring of balls so that the plane containing the centres of said balls constantly bisects the axes of the two shafts, whereby homokinetic drive is ensured.

The outer flange may be made in two parts, one comprising the spherical surface sliding on the outer surface of the bell and the other the spherical surface sliding on the second outer spherical surface of the head member, both parts being rigidly held together.

The outer flange may also be made in one piece.

Accessorily, a spherical casing provided with a sealing lining maintained constantly in contact with the outer spherical surface of the outer flange shields said surface from projections and foreign bodies.

Various embodiments of the invention are described in greater detail hereinafter by way of examples, reference being had to the appended drawings in which:

FIG. 1 is a longitudinal sectional view of a first embodiment of joint according to the invention, the connected shafts being in alignment;

FIG. 2 is a cross sectional view along line II—II of FIG. 1;

FIG. 3 is a longitudinal, sectional view of the joint of FIG. 1, the shafts forming a maximum angle to each other;

FIG. 6 is a longitudinal, sectional view of the same joint, the shafts being at the maximum angle one to the other;

FIG. 7 is a longitudinal, sectional view of a modification of said second embodiment;

Figure 4:
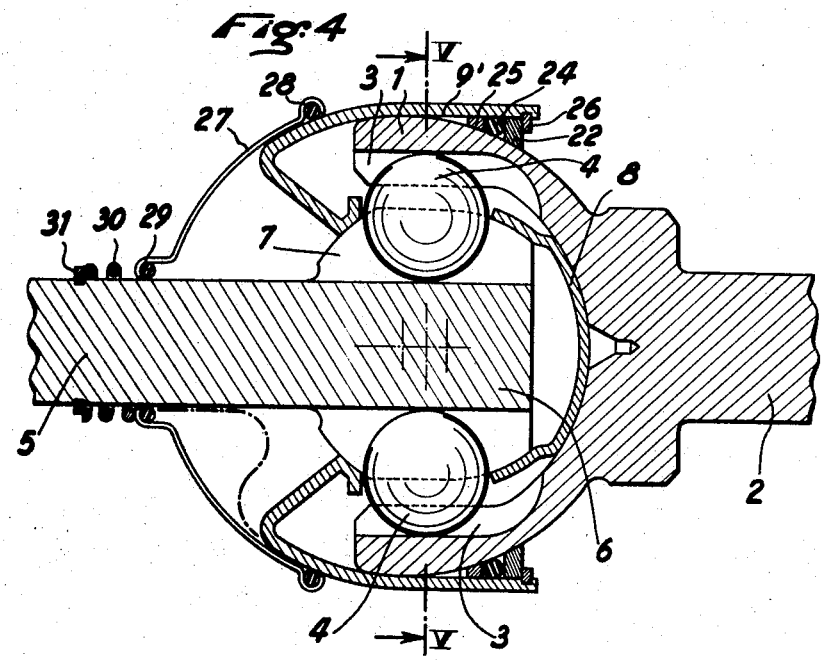
FIG. 4 is a longitudinal sectional view of a second embodiment of the joint, the shafts being in alignment.

Referring to FIGS. 1 to 3, the joint comprises a bell member 1 integral with a first shaft 2 in the inner surface of which are formed, parallel with the longitudinal axis of shaft 2, circumferentially spaced and having ball races 3 of hemicylindrical section in each of which a ball 4 may roll. A second shaft 5, which is to be connected to the first shaft 2, is integral with a head member 6 in the outer surface of which are formed spaced substantially hemicylindrical ball races 7 each facing one ball race 3 of the bell member to receive the corresponding ball 4.

In the embodiment shown in FIG. 1 bell member 1 and shaft 2 on the one hand, and head member 6 and shaft 5 on the other are integral but the head member or the bell member may well be manufactured separately and be rigidly secured to shaft 2 or 5 according to the case, for example by a sleeve-joint having male and female grooves.

Positioning of balls 4 and axial positioning of head member 6 in bell 1 are obtained by means of two flanges 8 and 9 made of sheet steel, arranged on either side of balls 4.

Flange 8, hereafter called the inner flange, comprises two active spherical surfaces: surface 10 centered at point Q having a radius $r_1$, said surface 10 bearing and sliding on an inner spherical surface 11 of bell member 1 having the same centre Q and radius $r_1$, and surface 12 centered at P on the longitudinal axis of shaft 5 and having a radius $r_2$, said surface 12 bearing and sliding on a first outer spherical surface 13 of head member 6 having the same center P and radius $r_2$.

In the embodiment of FIGS. 1–3, flange 9, hereafter called the outer flange, consists of two portions 9a and 9b. Portion 9a of flange 9 includes an inner active surface 14 centered at Q and having a radius $R_1$ bearing and sliding on an outer spherical surface 15 of bell member 1 having the same center Q and radius $R_1$, and portion $9_b$ includes an active surface 16 centered at P and having a radius $R_2$, bearing and sliding on a second outer spherical surface 17 of shaft head 6 having the same centre P and radius $R_2$. O being the center of articulation of the joint, distances OP and OQ are made equal and as a result the plane containing the centres of balls 4 and passing by point O bisects the axes of both shafts and homokinetic drive is thus obtained.

The joint is completed by a protective housing 18, of sheet metal, provided with a sealing bead 19 and which protects the spherical surface 15 of the outer flange from projections and foreign bodies.

An elastomer bellows 20 maintains lubricant inside the joint.

The two portions 9a and 9b of outer flange 9 are rigidly connected by means of a circlip 21 which fits in a groove of portion 9a.

Figure 5:
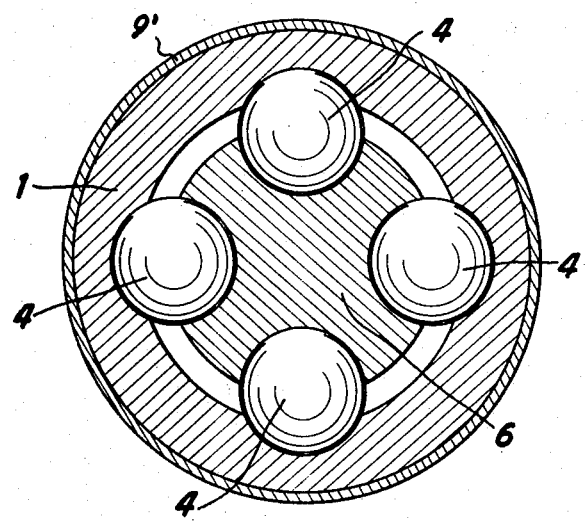
FIG. 5 is a cross sectional view along line V—V of FIG. 4.

FIGS. 4 to 6 show a second embodiment of the joint of the invention in which the outer flange is made in a single piece 9' mounted on bell member 1 of shaft 2 by means of an annular bearing 22 maintaining a friction ring 25 and a sealing bead 24. Parts 9', 22, 24 and 25 are held in place by a circlip 26 fitting into a groove in flange 9'.

An obturator ring 27 closes the joint around shaft 5 and includes two sealing beads 28 and 29. Obturator ring 27 is held in engagement with flange 9' by a spring 30 bearing on a washer 31 fitted into shaft 5.

Obturator ring 27 may be replaced by a flexible funnel member 35 shown in dot and dash line.

FIG. 7 shows a modification of the embodiment of FIGS. 4–6 in which ball races paths 3 and 7 formed in bell member 1 and in head member 6 respectively are inclined with respect to the axis of the corresponding shafts 2 and 5. In this case, centres P and Q of the active spherical surfaces of the two flanges may be merged.

Figure 8:
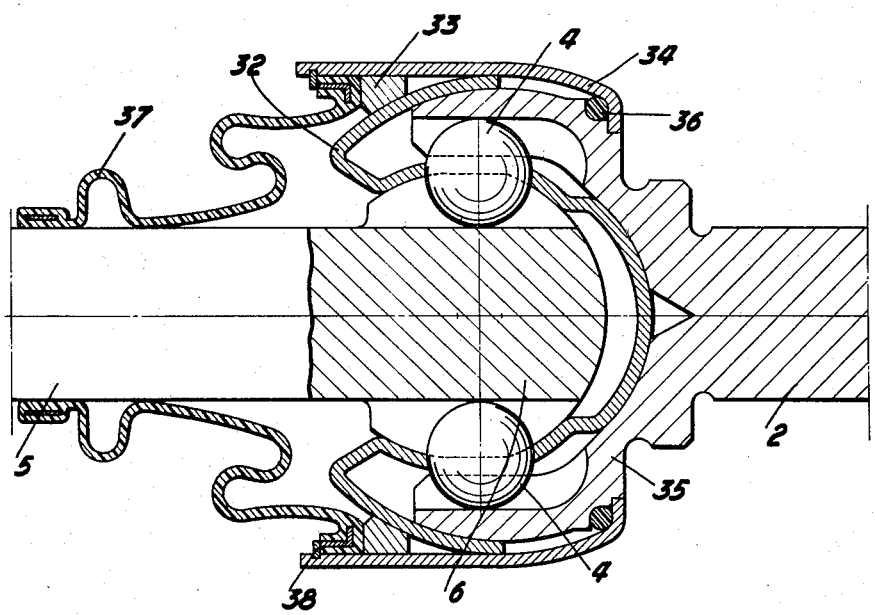
FIG. 8 is a longitudinal, sectional view of another embodiment of the joint, the shafts being aligned.

FIG. 8 shows a third embodiment of the joint of the invention in which the outer flange 32 is held axially by a friction ring 33 secured in a cover 34. Ring 33 may be integral with the cover the sealing relation of which with bell member 35 is ensured by packing 36. A bellows 37, held between a circlip 38 and ring 33 enables lubricant to be maintained within the joint.

Figure 9:
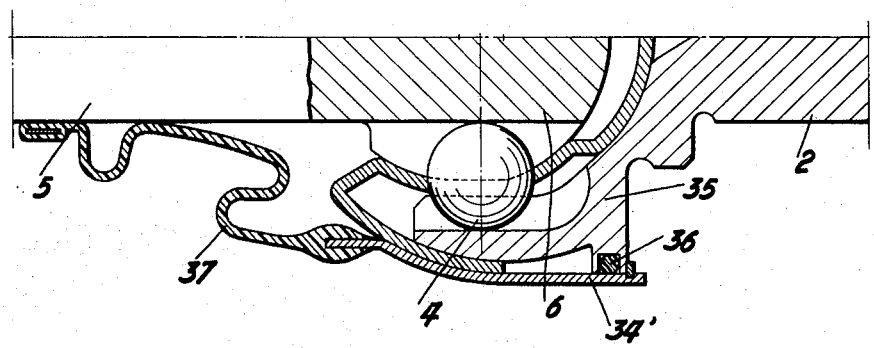
FIG. 9 is a half sectional view of a modification of this last embodiment.

FIG. 9 shows a modification of the embodiment of FIG. 8, in which cover 34' may be withdrawn in the direction of shaft 5 opposed to shaft 2.

Flexible sealing bellows 37 may be maintained on cover 35 by an adhesive or by any other known means.

The hereinabove described embodiments are simply given by way of examples and all alterations as to shape and detail may be brought thereto without thereby departing from the scope and spirit of the invention as hereafter claimed.

What I claim is:

1. A universal joint for mechanical connection of a first and a second rotating, angularly displaceable shafts having longitudinal axes intersecting at a meeting point, said joint comprising a bell member having an inner and an outer working surfaces and secured to one end of said first shaft; a head member having an outer working surface and secured to one end of said second shaft facing said end of said one shaft, said head member engaging within said bell member with a clearance and having a front portion toward said first shaft and a rear portion away from said first shaft; a plurality of circumferentially spaced rectilinear ball races in said inner surface of said bell member, each of said ball races having a longitudinal axis in a plane containing said longitudinal axis of said first shaft, an equal number of circumferentially spaced, rectilinear ball races in said outer surface of said head member, each of said ball races in said head member having a longtiudinal axis in a plane containing said longitudinal axis of said second shaft, and facing a ball race in said inner surface of said bell member to form a pair of opposed ball races, a ball in each pair of ball races, whereby a ring of balls is formed having a common mean plane intersecting said axes of said first and second shafts at said meeting point; a first spherical bearing face on said inner surface of said bell member, and a second spherical bearing face on said outer surface of said bell member, both said first and said second bearing faces of said bell member being centered at a first common centre point located on said axis of said first shaft at a given distance of and on one side of said meeting point; a first spherical bearing face on said rear portion of said outer surface of said head member and a second spherical bearing face on said front portion of said outer surface of said head member, both said first and second bearing faces of said head member being centered at a second common centre point located on said axis of said second shaft at the said given distance from and on the other side of said meeting point with respect to said first centre point; a first, cup shaped flange member having a first, outer spherical bearing face conforming to, and adapted to slide on said first, inner bearing face of said bell member, a second, inner spherical bearing face conforming to, and adapted to slide on said second, front bearing face of said head member, and a circular rim abutting on one side of said ring of balls; a second, annular flange member comprising an inner portion having a first spherical bearing face conforming to, and adapted to slide on said first rear bearing face of said head member, and a circular rim applying on another side of said ring of balls, and an outer portion extending over said bell member and having a second, outer spherical bearing face of said bell member.

2. A universal joint as claimed in claim 1, in which said inner and outer portions of said second, annular flange member are made as separate parts assembled one within another.

3. A universal joint as claimed in claim 1, in which said inner and outer portions of said annular flange member are formed in a single piece.

4. A universal joint as claimed in claim 1, in which said longitudinal axes of ball races in said bell member and said head member are parallel with said longitudinal axes of said first and second shaft, respectively.

5. A universal joint as claimed in claim 1, in which said ball races are inclined with respect to said longitudinal axes of said first and second shafts, respectively, and said given distance between said centre points and said meeting point is zero.

6. A universal joint as claimed in claim 1, in which a spherical cup shaped cover member is attached to said bell member adjacent said first shaft and extends over said outer portion of said second, annular flange member, said cover member having a rim part tightly applied against said outer portion.

References Cited

UNITED STATES PATENTS

| 2,046,584 | 7/1936 | Rzeppa | 64—21 |
| 2,150,942 | 3/1939 | Rzeppa | 64—21 |
| 2,238,647 | 4/1941 | Ivandick | 64—21 |
| 2,313,279 | 3/1943 | Suczek | 64—21 |

MILTON KAUFMAN, *Primary Examiner.*

HALL C. COE, *Examiner.*